US010702930B2

(12) United States Patent
Stafflage et al.

(10) Patent No.: US 10,702,930 B2
(45) Date of Patent: Jul. 7, 2020

(54) BORING MACHINE, BORING MACHINE SYSTEM, AND USE OF A BORING MACHINE

(71) Applicant: Johannes Lübbering GmbH, Herzebrock-Clarholz (DE)

(72) Inventors: Johannes Stafflage, Herzebrock-Clarholz (DE); Thomas Langhorst, Harsewinkel-Greffen (DE)

(73) Assignee: Johannes Lübbering GmbH, Herzebrock-Clarholz (DE)

( * ) Notice: Subject to any disclaimer, the term of this patent is extended or adjusted under 35 U.S.C. 154(b) by 0 days.

(21) Appl. No.: 16/097,309

(22) PCT Filed: Apr. 5, 2017

(86) PCT No.: PCT/EP2017/058156
§ 371 (c)(1),
(2) Date: Oct. 29, 2018

(87) PCT Pub. No.: WO2017/186467
PCT Pub. Date: Nov. 2, 2017

(65) Prior Publication Data
US 2019/0134718 A1 May 9, 2019

(30) Foreign Application Priority Data
Apr. 29, 2016 (EP) .................................... 16167815

(51) Int. Cl.
*B23B 45/00* (2006.01)
*B25F 5/00* (2006.01)
*B23Q 5/32* (2006.01)
(52) U.S. Cl.
CPC ............ *B23B 45/008* (2013.01); *B23Q 5/326* (2013.01); *B25F 5/001* (2013.01); *B23B 2260/07* (2013.01); *B23Q 2220/006* (2013.01)

(58) Field of Classification Search
CPC ...... B23B 45/008; B23B 45/001; B23Q 5/326; B25F 5/001
See application file for complete search history.

(56) References Cited

U.S. PATENT DOCUMENTS 5,205,681 A    4/1993   Eckman
8,696,265 B2 * 4/2014   Elsmark ................. B23Q 5/326
                                              173/217

(Continued)

FOREIGN PATENT DOCUMENTS

EP     2754531 B1   9/2015
GB      657310 A    9/1951
GB     2489018 A    9/2012

OTHER PUBLICATIONS

International search report for patent application No. PCT/EP2017/058156 dated Jul. 28, 2017.

*Primary Examiner* — Alan Snyder
(74) *Attorney, Agent, or Firm* — Bachman and LaPointe PC; George Coury

(57) ABSTRACT

The invention relates to a boring machine comprising a spindle (15) which is designed for rotationally driving a boring tool that is placed or can be placed on the spindle and which is paired together with rotational drive means that interact with a first drive motor (24) for rotational driving purposes and with adjustment drive means that interact with a second drive motor (26) for axially adjusting the spindle such that when the spindle is being rotated by the first drive motor, the spindle can be axially adjusted under the effect of the second drive motor. The rotational drive means have a rotational drive gear (38) which is connected to the spindle, and the adjustment drive means have an adjustment nut (58) which interacts with a threaded section (60) of the spindle (15) in the manner of a slide. Transmission means are (Continued)

integrated in the form of a transmission module for interacting with the rotational drive gear and the adjustment nut and are designed to connect to the first and the second drive motor. The transmission means have an adjustment gear (54) for meshing into a toothing of the adjustment nut (58), said adjustment gear being driven by a toothed gear assembly (46, 42) which engages onto an outer toothing (52) of the adjustment gear such that at least one first toothed gear (42*a-c*) of the toothed gear assembly receives a drive torque of the second drive motor, in particular the at least one first toothed gear interacts directly with a drive shaft (30) of the second drive motor (24, 24A), and at least one second toothed gear (46*a-c,* 46'*a-c*) of the toothed gear assembly transmits a drive torque of the first toothed gear (26, 26*k*) to the outer toothing (52), in particular the at least one second toothed gear meshes directly with the first toothed gear and the outer toothing. The toothed gear assembly is held in a cage-like toothed gear support (44) such that at least the second toothed gear, preferably the first and the second toothed gear, can be released from the transmission module and replaced when disassembling the adjustment gear and/or a module which drives the rotational drive gear, in particular a toothed gear unit.

17 Claims, 6 Drawing Sheets

(56) References Cited

U.S. PATENT DOCUMENTS

| | | |
|---|---|---|
| 2007/0209813 A1 | 9/2007 | Veres |
| 2008/0260485 A1 | 10/2008 | Jaillon et al. |
| 2014/0318290 A1 | 10/2014 | Eriksson et al. |

\* cited by examiner

BORING MACHINE, BORING MACHINE SYSTEM, AND USE OF A BORING MACHINE

BACKGROUND OF THE INVENTION

The present invention relates to a drilling machine, as known from EP 2 754 531 B1. The present invention further relates to a use of such a drilling machine and the present invention relates to a system using such a drilling machine.

Generic drilling machines having a spindle for rotatably driving a drilling tool which is attached or can be attached are commonly known from the state of the art. In particular fixed box column drills exist in addition to hand drills made for manual handling, and different embodiments from private to industrial use are available.

In addition to its rotatory drive, in particular drilling machines used for industrial purposes often require another function besides the motor-driven spindle drive, namely the generation of an axial feed for the (drilling) spindle-special requirements, for example in industrial mounting and production environments, often necessitate a controlled feed adjusted to a drive power for the spindle rotation and to the properties of a material to be drilled, said feed not being sufficiently achievable only by manual operation.

Accordingly, providing a displacement drive on the spindle (causing an axial spindle feed or a spindle movement) in addition to the rotatory spindle drive is known from the state of the art by means of different approaches existing parallel to each other. Apart from drive solutions separated from one another for the rotation drive as well as for the axial displacement, particularly integrated solutions are also considered for this purpose, allowing both operational functionalities on the spindle by means of suitably integrated shared transmission solutions. GB 2 489 018 A for example discloses a drilling machine technology for industrial use in which, realized via a coupled pair of epicyclic gear trains, an integrated transmission arrangement transfers the rotatory momentum of a main drive as well as a feed or displacement momentum of a displacement drive onto the drilling spindle in the intended manner and ensures an appropriate decoupling within the scope of such integrated transmission arrangements.

However, this known solution has proven to be technologically demanding and constructively sophisticated, with there being room for improvement, in particular with regard to a simple production possibly suitable for series production.

A corresponding improvement has been made in the form of the technical teaching of EP 2 754 531 B1. Based on the technical principle of the state of the art of the aforementioned document, a modular transmission is proposed in this case, again by using an (albeit individual) epicyclic gear train, said modular transmission transmitting the drive torque of two drive motors—a first drive motor for the spindle drive and a second drive motor for the axial spindle displacer—to the spindle in such a way that a compact and operationally reliable device is created having a limited number of components.

Constructively essential for realizing the (shared) transmission of this known technology is providing the epicyclic gear train whose sun wheel is connected to the drive motor which is intended for the spindle displacement. Planet gears of the epicyclic gear train mesh the sun gear and engage in an annular internal toothing of a cup-shaped wheel, which in turn causes the rotatory spindle drive on the exterior. The translation ratio of the transmission affecting the spindle feed is thereby especially affected by the sun wheel, the planet gears and the inner toothed rim.

While this known technology according to EP 2 754 531 B1 is elegantly constructed and is realized having a minimized number of transmission components, a technology of this type nevertheless seems inflexible and therefore in need of improvement, in particular regarding a variable production of generic drilling machines—it can make sense, in particular with respect to a construction or a setup of known drilling machines according to the preamble of the independent claim, to adjust or appropriately set up the feed in accordance with a field of application of the drilling machine, in particular in accordance with the type of bores, typical drilling machine tool diameters, material characteristics of the work pieces and the like. This is particularly useful for the technologically challenging and sensitive area of aircraft manufacturing, for example, where, besides typical metal materials, in particular an increasing number of composite (plastic) materials are to be drilled which have other requirements with regard to an axial spindle displacement commonly provided and intended to be driven.

While the technology according to EP 2 754 531 B1 could for this purpose generally provide the variable electronic control of the motor which is provided for and coupled with the displacement drive, such an adaptability nevertheless often proves to be insufficient in practice, for example with regard to the desired torque characteristics. Mechanically adjusting the transmission translation for the displacement drive train for the preamble of the state of the art according to EP 2 754 531 B1 would, however, cause significant constructive efforts because due to the inner rim of the cup-shaped component of the known technology which is involved in this transmission translation, it is not only difficult to adjust different embodiments of the drilling machine constructively and geometrically (which in turn also applies to the embodiment of the sun wheel, which typically sits on a shaft associated with the displacement drive motor), but these component groups, in particular the internally toothed components, are also expensive and sophisticated to produce and to assemble.

SUMMARY OF THE INVENTION

Hence, the object of the present invention is to simplify and to improve the flexibility of a generic drilling machine according to the preamble of the main claim with regard to its setting, configuration and assembly characteristics, in particular regarding its flexibility when adapting a transmission translation, which influences the displacement drive for the axial spindle displacer, in terms of the transmission mechanism, and thus in particular to create the possibility of creating the constructive conditions needed for different production methods variable with regard to this transmission translation while using mostly identical parts, avoiding constructively sophisticated and expensive component groups and being capable of being assembled and possibly interchangeable in a simplified manner.

This object is attained by the drilling machine having the features disclosed herein. Advantageous embodiments of the invention are also described herein. Additional protection within the scope of the invention is claimed for a drilling machine system using the drilling machine according to the invention to which a gearwheel arrangement for being replaced for a mounted gearwheel arrangement is additionally assigned in such a way that by mounting and subsequently operating the additional set of gearwheels (gearwheel arrangement), a different transmission translation for the displacement drive, namely the transmission translation between the second drive motor and the displacement wheel for the spindle, is realized in the transmission module.

Protection within the scope of the invention is further claimed for a use of the drilling machine according to the invention as a hand drill and according to the invention, protection is claimed for the use of the drilling machine according to the invention, preferably embodied as a hand drill, for producing bores for aircrafts and/or for driving drilling tools which are especially suitable for modern materials and drilling diameters used in manufacturing for aircrafts.

In an advantageous way according to the invention, the transmission module not having an internal gear and an inner toothing comprises a displacement wheel which is formed for meshably engaging in a toothing of a displacement nut, which in turn, according to the preamble, interacts in a slide-like manner with a threaded section of the spindle for its axial displacement. This displacement wheel comprises an (annular) outer toothing which is driven by a gearwheel arrangement comprising at least one first gearwheel and at least one second gearwheel. The at least one first gearwheel, typically realized as a plurality of first gearwheels disposed around a shaft of the (second) drive motor provided for initiating the displacement, takes up a drive torque of the second drive motor and transmits it to second gearwheels of the gearwheel arrangement according to the invention, which in turn are typically disposed in a plurality (and in a plurality corresponding to the number of first gearwheels) around the outer toothing of the displacement wheel and transmit the drive torque of the first gearwheels onto said outer toothing. In this context it is especially preferred if the second gearwheel, its toothed circle area comprising an axial minimal extension, directly meshes with the first gearwheel and the outer toothing so that a direct transmission takes place.

According to the invention, the first and the second gearwheel (preferably a plurality of each) are retained in a cage-like gearwheel carrier in such a manner that at least the second gearwheel, preferably the first and the second gearwheel (in turn more preferably each in a plurality of equal numbers), are replaceable and accordingly detachable when dismounting the displacement wheel by removing each of the assigned rotary axes from the carrier of the transmission module, in particular replaceable against a pair of first and second gearwheels (in turn also preferably in a plurality), which then realizes a different transmission translation.

Realizing the transmission in this advantageous manner according to the invention thus means turning away from the sophisticated principle of a epicyclic gear train; the internally toothed rim which is commonly necessary, constructively sophisticated and problematic with regard to a transmission translation is rather rendered unnecessary as the present invention drives the displacement wheel, which is provided for interacting with the displacement nut, via an outer threaded section by means of the additional combination of the first and second gearwheel and therefore connects to the drive torque of the displacement motor. The invention thereby accepts the apparent disadvantage of requiring more components since the number of transmission elements involved increases (and would be multiplied accordingly for typical pluralities of the first and second gearwheel); however, this apparent disadvantage is offset in the scope of this invention by the combination of significantly increased flexibility which is achieved by the possibility of replacing and carrying out different transmission translations only by providing first or second gearwheels which are suitably adapted in diameter or toothing without having to adapt or replace constructively sophisticated assemblies. In addition, this solution according to the invention allows a simple adaption or change of the transmission translation in the displacement drive train for the axial spindle displacement by avoiding the epicyclic gear train technology, in the simplest case namely by means of suitably exchanging the first and second gearwheel, which can, just as within the scope of the system solution claimed according to the invention, suitably be provided or configured in the manner of a modular system and thereby allows the flexible and adaption to different requirements of respective drilling machines for the intended uses.

Thus, it is constructively particularly simple and elegant for the described assembling and dismounting uses that the displacement wheel (intended for the displacement nut) and the cage-like gearwheel carrier, more preferably additionally a gearwheel (gearwheel unit) with the rotary drive wheel for applying the spindle in a rotatory manner, are provided coaxially on a torque which is assigned to the second drive motor (so the motor which is provided for the displacement drive) and is more preferably stored parallel to the axis of the drilling spindle; further preferably, the units disposed for the drive of the transmission means, namely the displacement wheel and the gearwheel unit frame the cage-like gearwheel carrier on either side in the direction of the axis.

It is also advantageous to attach at least one drive motor, preferably both drive motors, angular to the transmission module, in particular in the context of a manually manageable, portable tool realized in a simplified constructive manner, in particular a rectangular attachment point for the first and for the second drive motor allowing, in a particularly suitable manner, the advantage that said motors, in particular a typically more powerful first drive motor for the rotatory spindle drive, can then be housed in a handle section of the device provided for manual handling. Alternatively, an angle of 0° is also possible in the manner of an inline arrangement.

While, in particular in the context of lower transmission component costs and a simple assembly, it is advantageous, on the one hand, to provide the (at least one) second gearwheel of the gearwheel arrangement according to the invention with a continuous, singular and unstepped toothing, meaning that the same gearwheel geometry is allowed to axially act on the first gearwheel on the one end as well as on the outer toothing of the displacement wheel on the other end, it is, on the other hand, nonetheless within the scope of alternative and equally preferred embodiments of the invention to provide at least one of the first or second gearwheels, preferably the second gearwheel, with a stepped toothing in such a way that said partners are facing different gearwheel geometries. It is advantageous, for example, to let a gearwheel section of a larger toothed circle diameter engage with the (more preferably also stepped) outer toothing of the displacement wheel for the second gearwheel according to the invention while a gearwheel section of a smaller toothed circle diameter meshes with the first gearwheel. Thus, the variability or the range of variations in the manufacturing of different translations in the displacement transmission train can be modified or formed further.

While the present invention can be operated and handled in a particularly favorable manner as a handheld device (not least because of the transmission means according to the invention being realized in a slim and compact manner, preferably parallel to the axis of the drilling spindle), the present invention is not limited to this embodiment. Instead, the use of the invention comprises the scope of a fixed drilling machine, for example a box column drill, as well as the use of the drilling machine according to the invention beyond the usage in aircrafts. Ultimately, the present invention is suitable for use in any favorable manner in which the advantages of a carefully coordinated axial displacement feed or an axial displacement feed set by a suitable transmission configuration can be combined with the realized advantages of simple assembly and manufacturing according to the invention, even in the matter of different transmission translations to be implemented.

Further advantages, characteristics and details of the invention derive from the following description of preferred exemplary embodiments as well as from the drawings.

DETAILED DESCRIPTION

In all drawings, the character "A" refers to a first embodiment while character "B" refers to a second embodiment varied with respect to the first embodiment; the second exemplary embodiment B differs to the first embodiment in a stepped second gearwheel as explained in further detail in the following.

Figure 1:
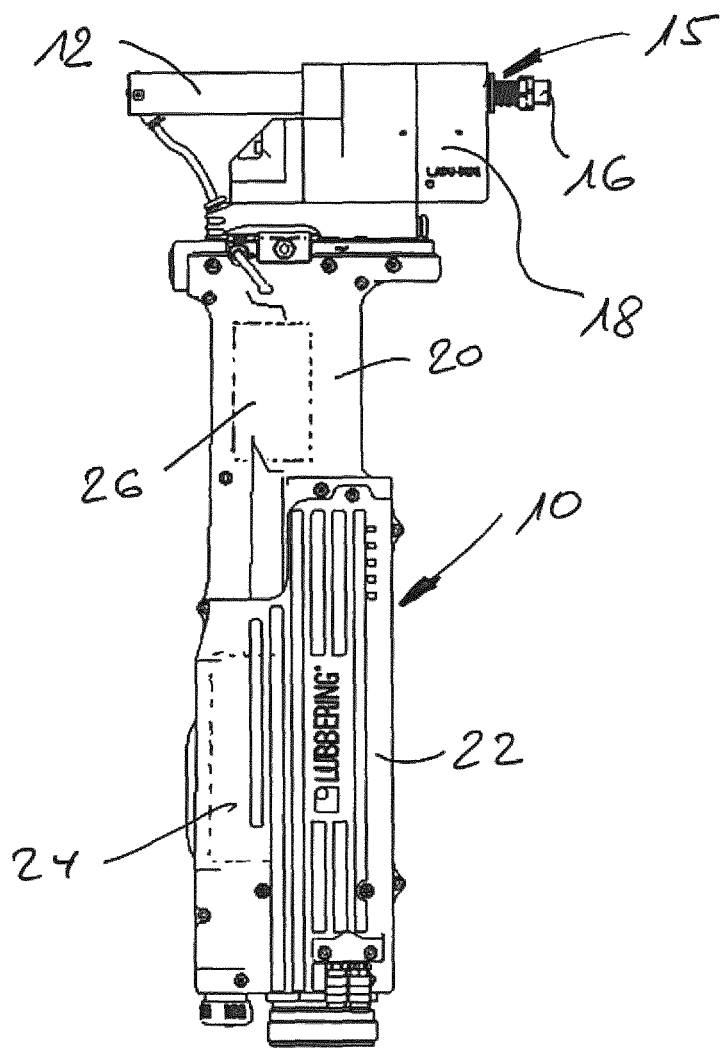
FIG. 1 shows a side view of the drilling machine according to the invention according to a first exemplary embodiment in a side view having an elongated, gun-like housing.

In a side view, FIG. 1 shows a housing of the drilling machine according to the invention made from plastic and intended for manual handling according to the preferred exemplary embodiments to be explained in detail. A (drilling) spindle 15 which extends horizontally and is enclosed by a sleeve-shaped housing 12 comprises an otherwise known clutch on an inlet end 16 for using and fixing drilling tools.

A transmission housing section 18 partially encloses the spindle accommodated in the section 12 as shown and merges at the bottom into a first handle section 20 reduced in diameter as well as into an attached second, handle section 22 widened in comparison. These handle sections 20, 22 serve to receive a first drive motor 24 (not shown in detail) for a rotatory drive of the spindle or a second drive motor 26 (not shown in detail) for causing a feed displacement of the spindle in its axial extension direction explained in detail in the following. Owing to different motor powers, the first drive motor 24 which is typically larger dimensioned is accommodated in the widened handle section 22, the second drive motor 26 (displacement motor) which is weaker in comparison is accommodated in the intermediate section 20 and is coupled to bevel wheels 24k for the first drive motor and 26k for the second drive motor via motor shafts not shown in detail; in accordance with the elongated housing form of FIG. 1, a respectively longer shaft (not shown in the figures) is assigned to the associated bevel wheel 24k and guided past the motor 26.

The FIGS. 2 to 6 (each displayed with the individual views "A" for the first embodiment and the individual views "B" for the alternative second embodiment) clarify how a drive momentum of these drive motors is coupled into a transmission module via the respectively assigned bevel wheels 24k or 26k, said transmission module being seated in the housing section (FIG. 1), and, on the one hand, causes the rotatory drive connection and, on the other hand, causes the axial longitudinal displacement connection to the spindle 15: a bevel wheel 28, which interacts perpendicular in the longitudinal section with the bevel wheel 26k of the second drive motor (for the axial displacement) is seated on a displacement shaft 30 which essentially extends parallel to the spindle 15 and the bevel wheel 28 drives the displacement shaft 30 in rotatory movement according to the rotation of the bevel wheel 26k. The bevel wheel 24k assigned to the rotary drive motor (first drive motor) 24 interacts equally rectangular with a gearwheel unit for rotatory operation 32 which meshes with the bevel wheel 24k on a bevel-toothed section 34. An outer toothing 36 of the gearwheel unit 32 rotatably mounted on the shaft 30 meshes with an outer toothing of a rotary drive wheel 38 which (not shown in detail in the figures) is non-rotatably connected with the spindle 15 via locking means. Thus, the described functional chain of the gearwheel transmits a drive moment of the first drive motor 24 to the spindle 15 via the components 24k-32-38.

The displacement shaft 30 which is assigned to the second drive motor 26 comprises an outer toothing area 40 which is disposed on a jacket section and interacts in a meshing manner with a set of three gearwheels 42a, 42b, 42c which in turn are dispersed in a cage-like gearwheel carrier housing 44 around the periphery of the shaft 30 and mesh with a set of three (referring to the shaft 30) radially outer second gearwheels 46a, 46b, 46c, which are disposed at an offset and are each assigned in pairs.

These radial outer second gearwheels 46a-c are rotatably mounted in said cage-like carrier housing 44 which, indicated by a screw thread 48 (FIGS. 6A, B), is non-rotatably connected with the assembly group 32 (the gearwheel unit for the rotary drive of the spindle) while at the same time being detachable for dismounting. The screw connection 48, cf. in particular the cross sectional views of FIG. 6A, FIG. 6B, locks the rotatory or central axes 50a-c in the shown mounting state which are each assigned centrally to the second gearwheels 46a-c.

As the different views of the figure pairs 2 to 6 in turn clarify, an axial section of the second gearwheels 46a engages with a second outer toothed section 52 of a displacement wheel 54 which in turn meshes with a displacement nut 58, which is assigned to the spindle 15 and is formed for the axial displacement of the spindle 15, via a first outer toothed section 56. By means of an inner threaded section 62 which interacts with an outer thread 60 of the spindle 15, the displacement nut 58 specifically causes the longitudinal displacement of the spindle in the manner of a threaded slide in a rotatory drive via the displacement nut 58 according to the aforementioned functional chain.

It becomes clear that the transmission module thus constructed comprises neither an internally toothed rim nor a (associated) internal gear, the present invention thus not requiring an epicyclic gear train. In particular the principle according to the invention exclusively comprising externally toothed wheels or gearwheel sections and designed in the form of the displacement wheel 54 (with the toothing sections 52, 56), the second gearwheels 46a-c, the first gearwheels 42a-c as well as the outer toothed shaft area 40 does not only ensure a favorable configuration of the individual components or the mounted arrangement of said individual components in manufacturing and assembly, but it also allows realizing a replacement and a modular modification of a resulting transmission translation in the described displacement transmission solution in a particularly simple manner, namely in the simplest manner by suitably coordinating and installing the respective pairs of the first gearwheel 42a-c using the respectively associated second gearwheel 46a-c, said pairs co-determining the transmission translation. Additionally, in particular the constructively advantageous and elegant arrangement of the assemblies 54, 44 (having first or second gearwheels contained therein) as well as 32 allow for a particularly simple assembly or dismounting along an axial extension direction of the shaft 30; for detaching the displacement wheel 54, for example, an axial bearing 66 only needs to be removed, after which, after removing the wheel 54 and subsequently removing the housing cage 44, it is possible to replace the first or second pairs of gearwheels in a simple manner. The reassembly is correspondingly simple.

Figure 7:
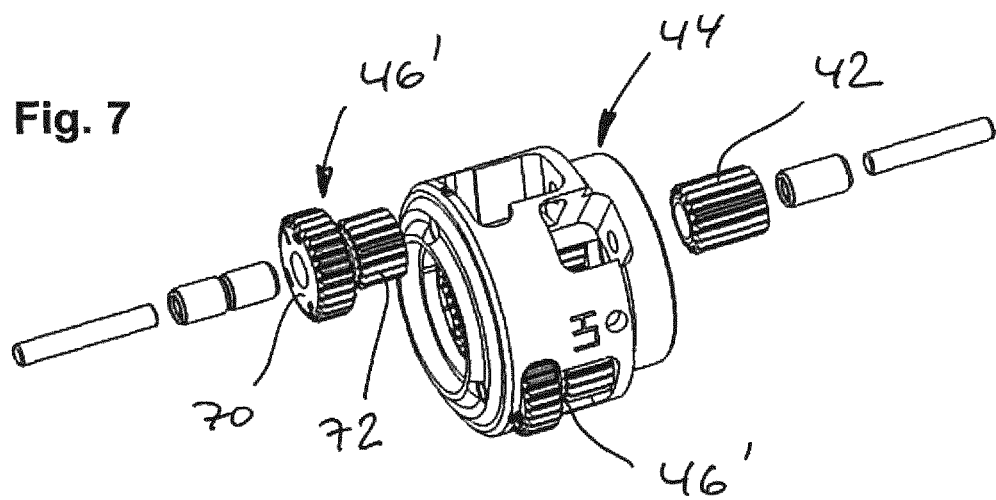
FIG. 7 shows an exploded detailed view for clarifying a possible replacement or substitution of the first or second gearwheel in the cage-like gearwheel carrier.
Figure 2:
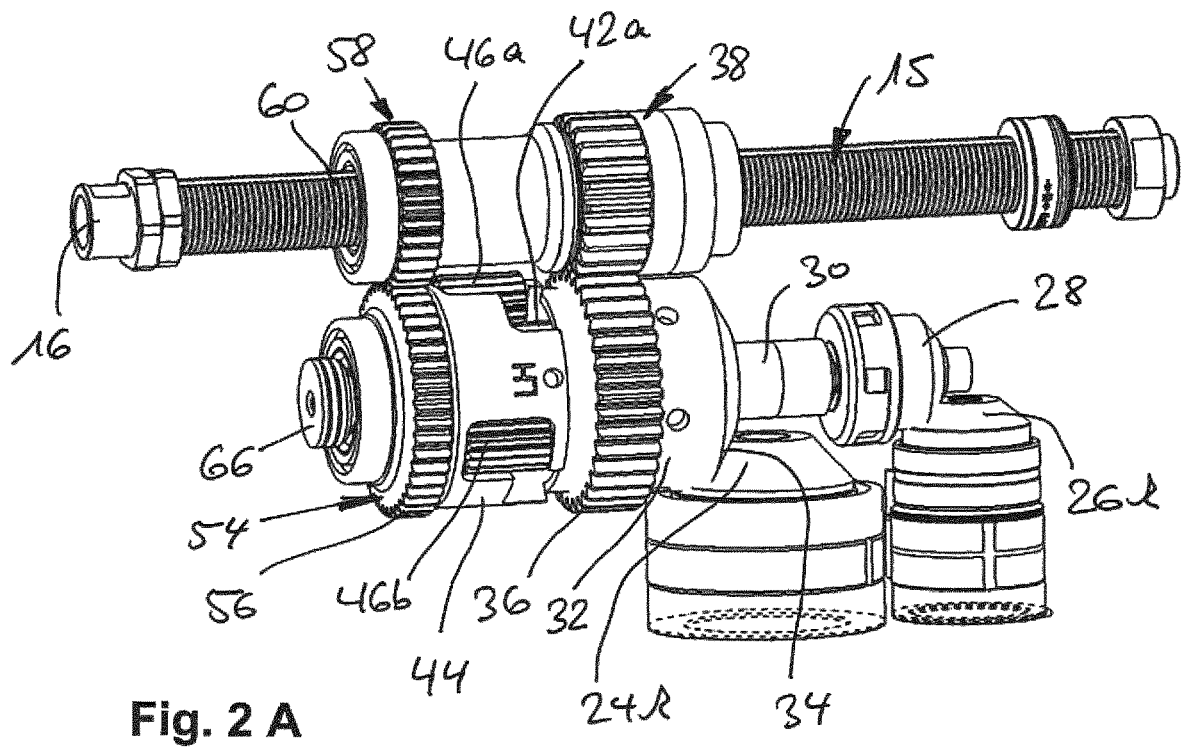
FIG. 2A.
FIG. 2B show perspective views of the transmission means according to the invention in the first exemplary embodiment of FIG. 1, additionally showing a spindle, a rotary drive wheel and a displacement nut, FIG. 2A showing a first and FIG. 2B showing a second exemplary embodiment, varied in contrast to the first exemplary embodiment, all views otherwise being the same.
Figure 2:
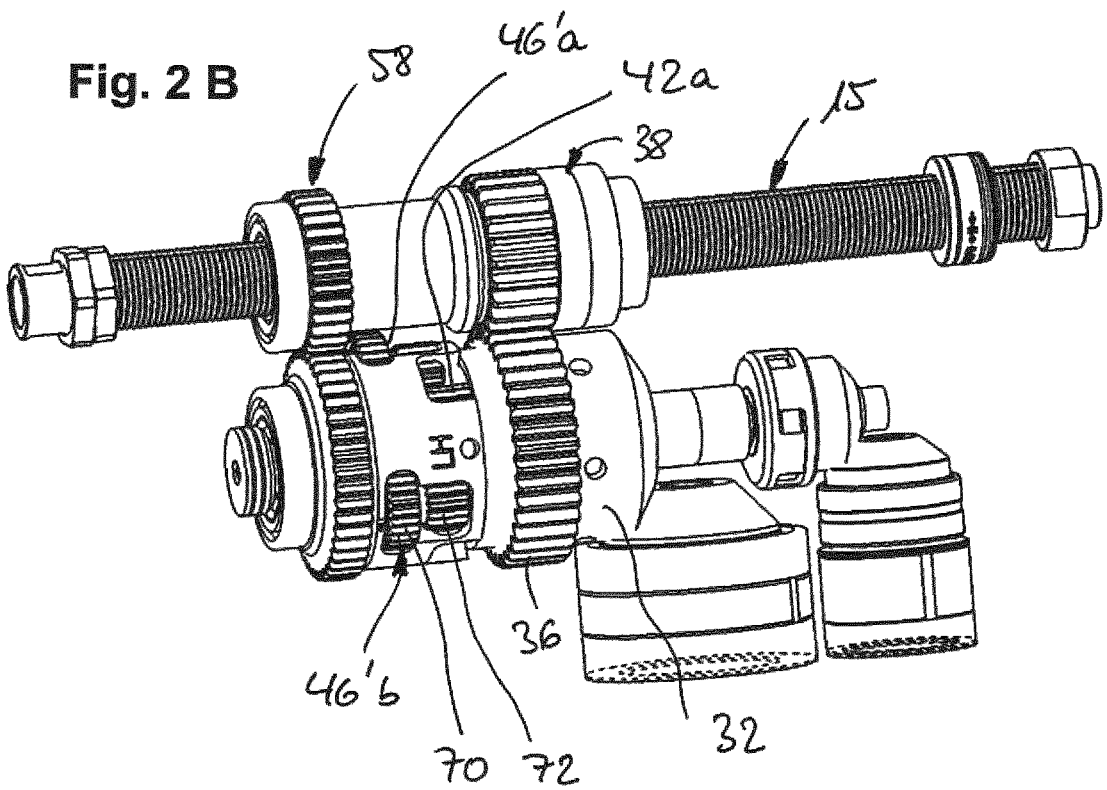
Figure 3:
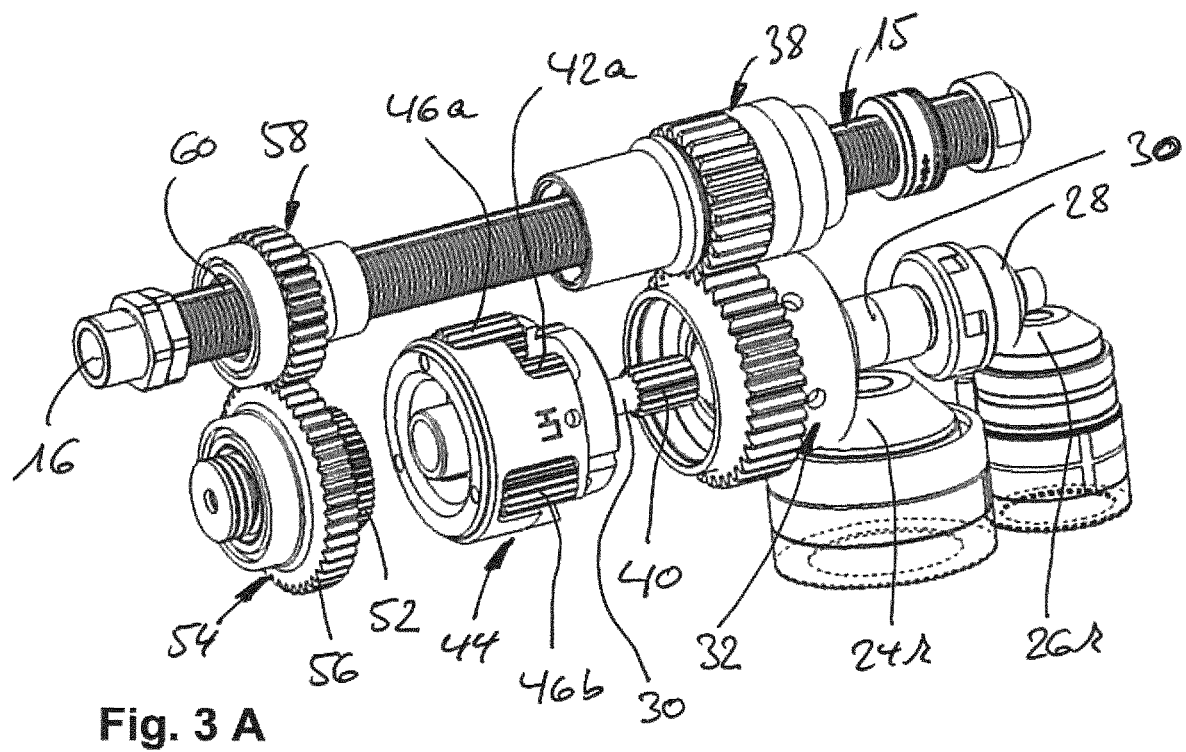
FIG. 3A.
FIG. 3B show perspective views analogous to FIG. 2A or FIG. 2B, however including the cage-like gearwheel carrier shown in a detached manner in an exploded view.
Figure 3:
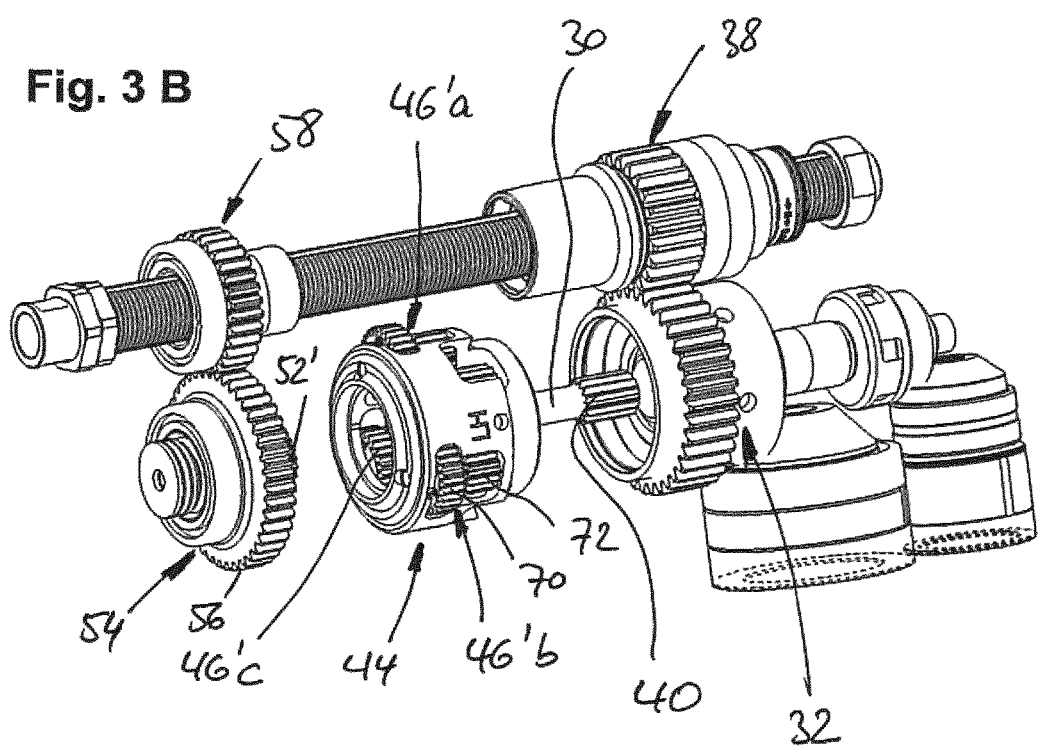
Figure 4:
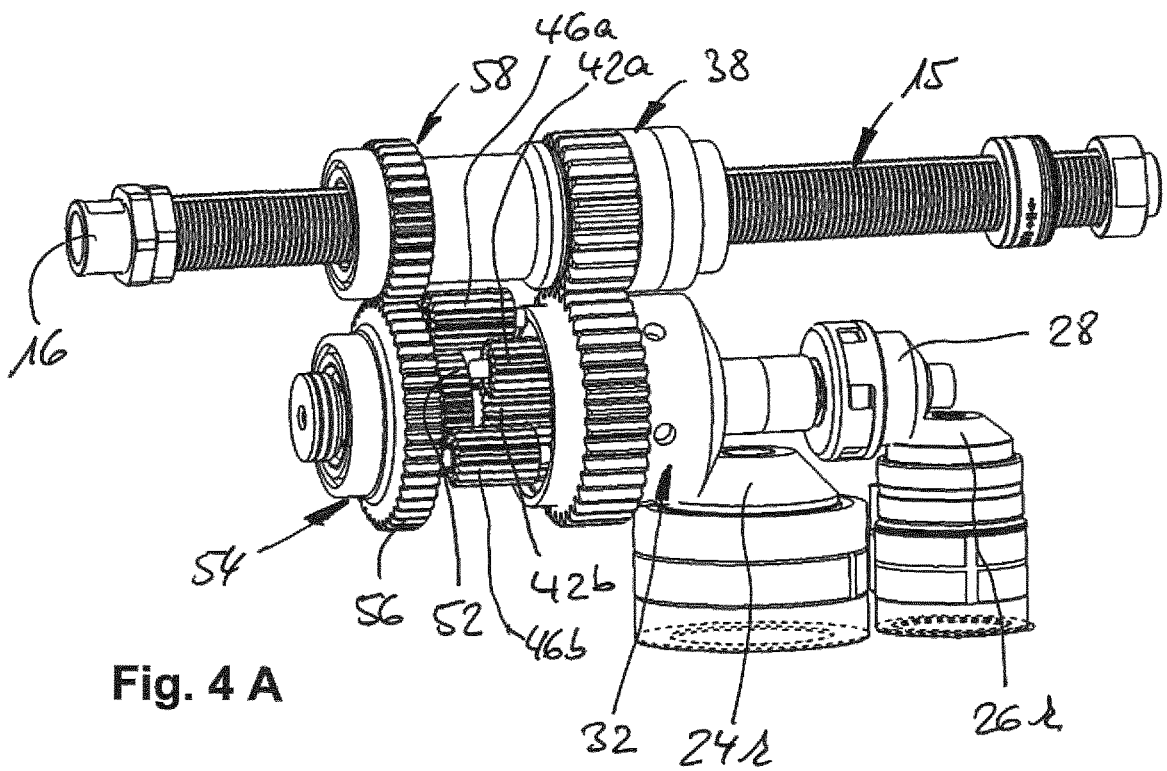
FIG. 4A.
FIG. 4B show a perspective view analogous to FIG. 2A, B or FIG. 3A, B with a removed gearwheel carrier in contrast to these figures for clarifying the interaction of the gearwheels in an assembled state.
Figure 4:
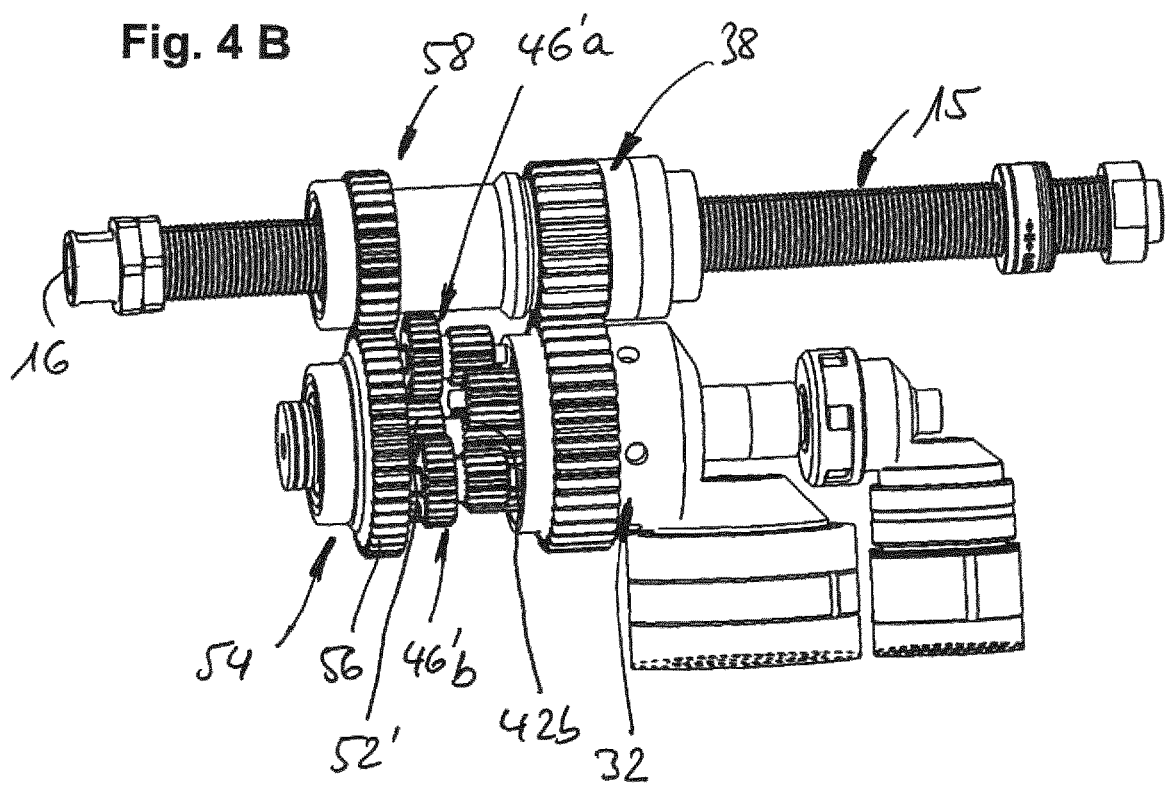
Figure 5:
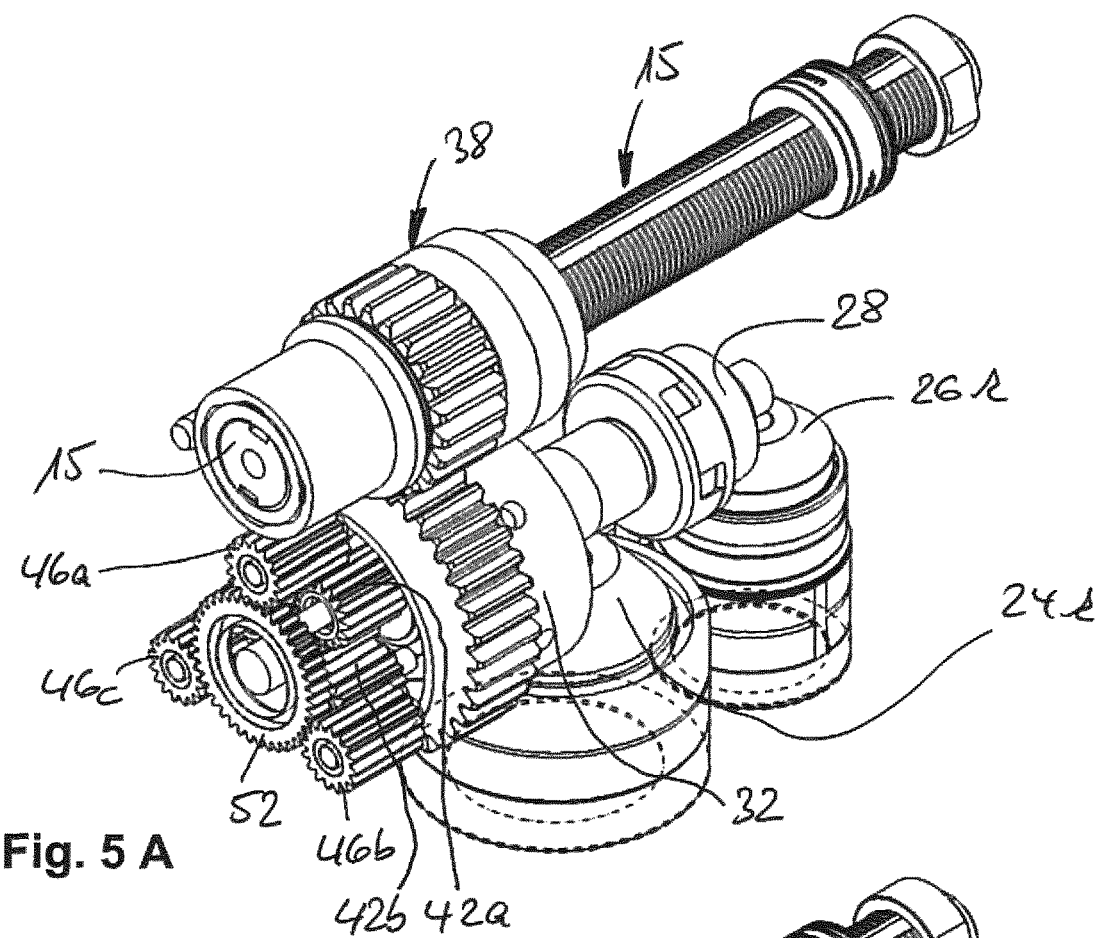
FIG. 5A.
FIG. 5B show axially cut partial views of the exemplary embodiments of FIGS. 1 to 4 with the displacement nut or the removed displacement wheel for clarifying in particular the interaction of the gearwheels in the transmission module.
Figure 5:
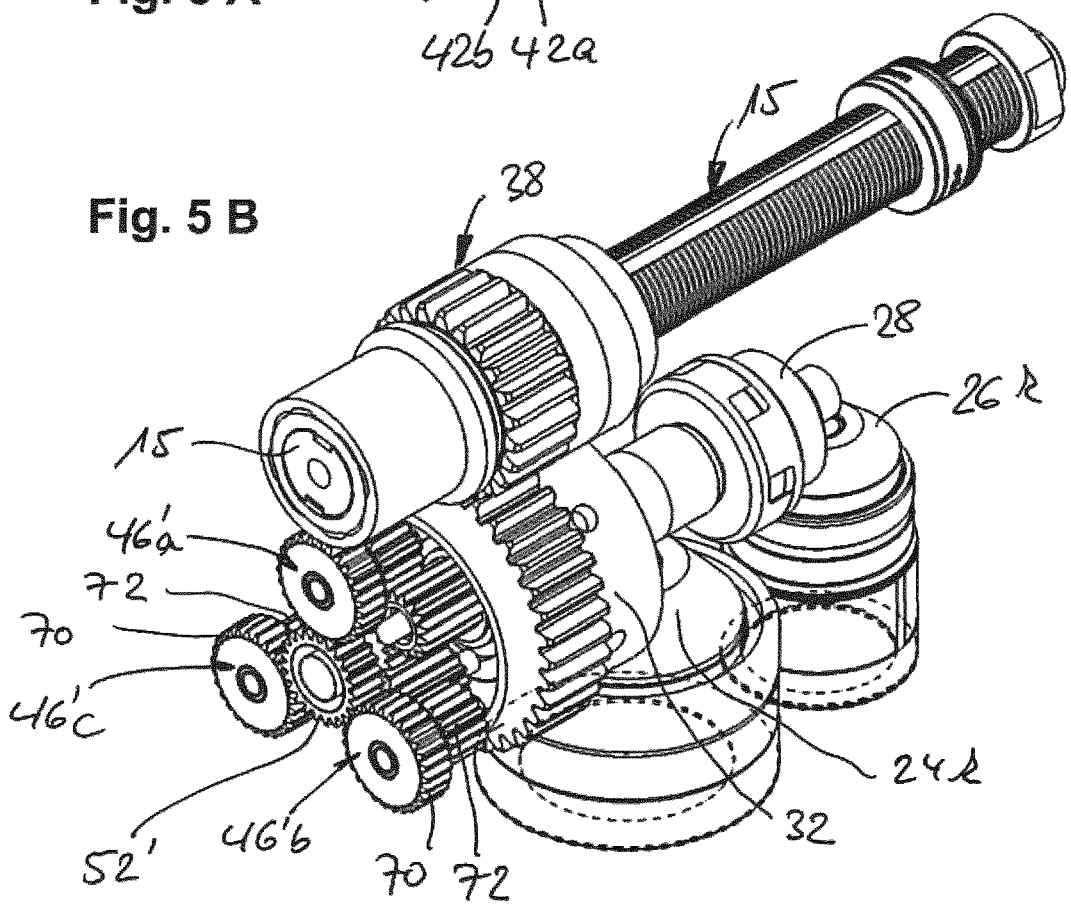
Figure 6:
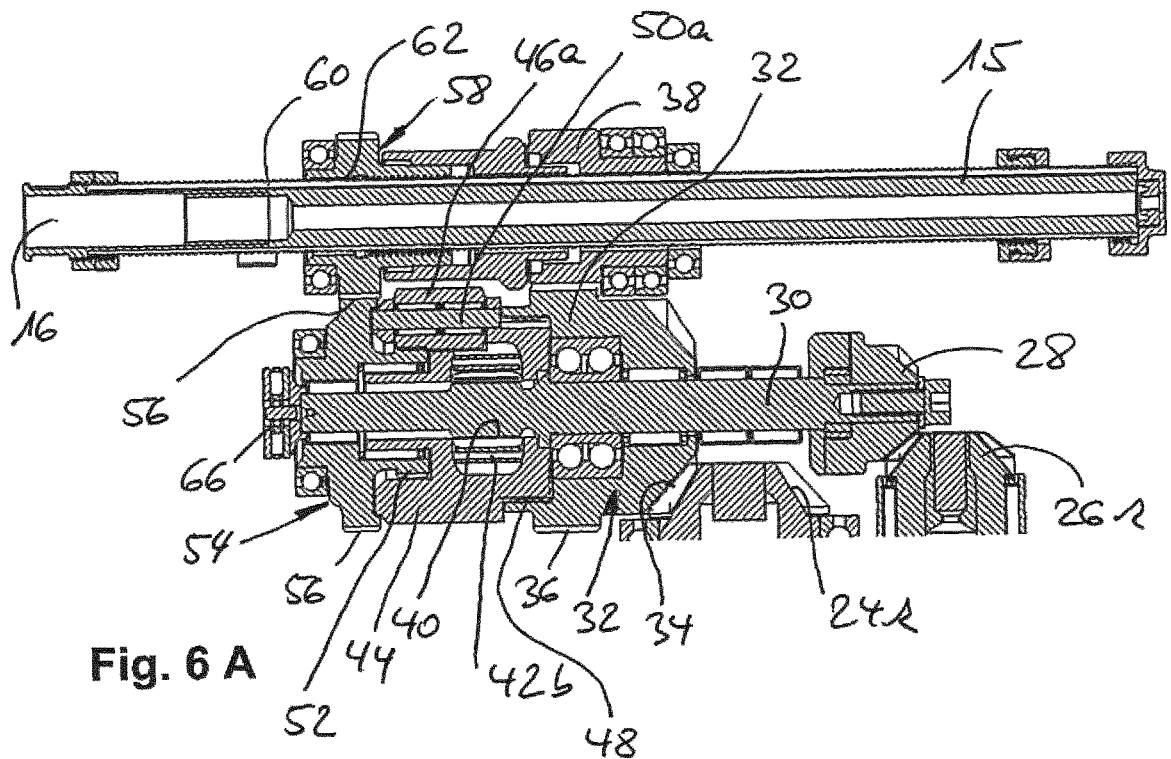
FIG. 6A.
FIG. 6B show longitudinal sectional views of the aforementioned exemplary embodiment, in this case in the versions of A or B.
Figure 6:
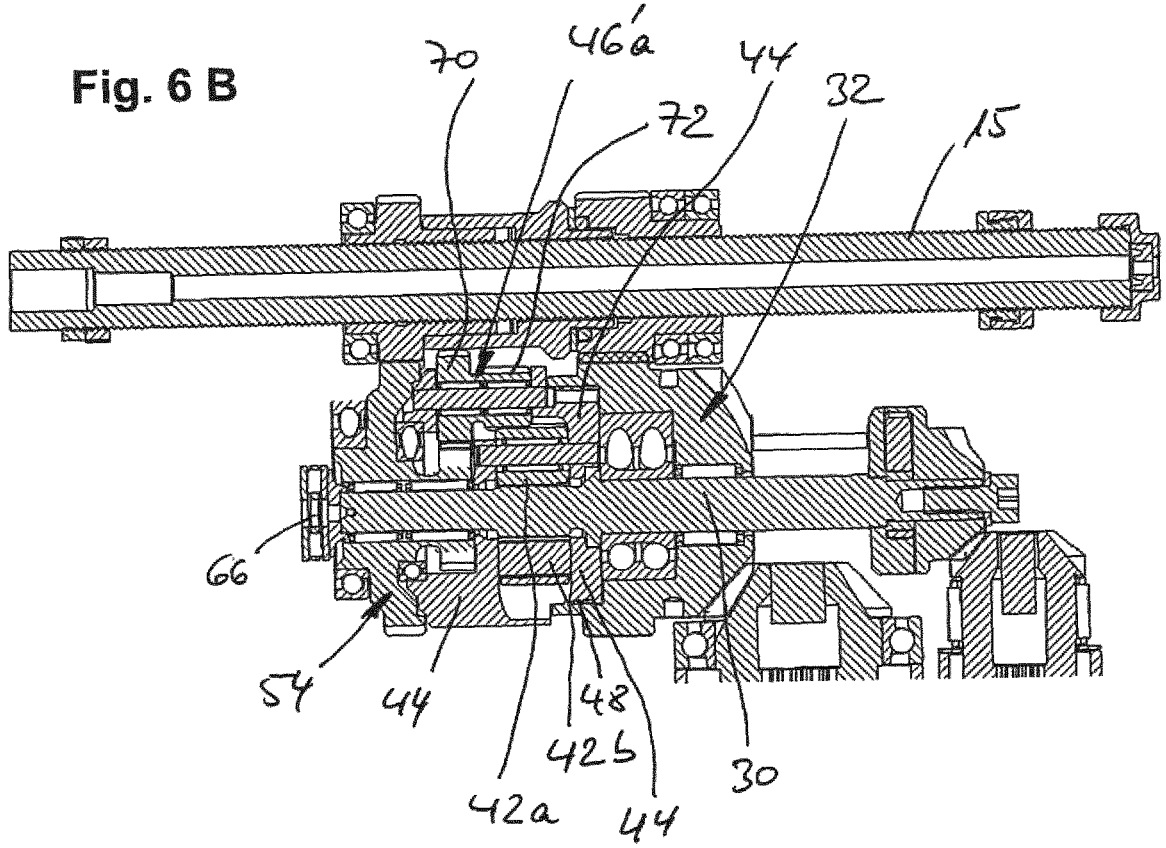

In FIG. 7 a further, possibly additionally allowed variant for a simple and constructively low-maintenance reconfiguration of the transmission translation in the displacement transmission is shown according to the second embodiment of the respective figures "B". In particular FIG. 7, insofar corresponding to the second embodiment B, shows a gearwheel 46' as a variant of for the second gearwheel 46a, 46b, 46c, said gearwheel 46' not comprising an axially continuous consistent diameter (toothed rim diameter) compared to the first embodiment but comprising (according to embodiment B) a stepped configuration in the form of a first gearwheel section 70 having a larger toothed circle diameter of the respective outer toothing and of a second gearwheel section 72 having a comparatively smaller toothed circle diameter of the outer toothing. As the respective FIGS. 2B to 6B clarify, the second gearwheel section 72 of the second gearwheels 46', which are in turn also provided in a group of three, meshes with the first gearwheel 42a or 42b or 42c while the first gearwheel section 70 drives the displacement wheel 54 by interacting with the outer toothing 52. In other words, the stepping enabled by the ratio 70/72 designed in combination with the first gearwheel 42 and the diameter of the outer toothing 52 (which comprises, relative to the first exemplary embodiment according to "A", a smaller outer diameter and is therefore referred to as 52') provides different translations along this transmission chain in a more flexible way.

While a hand drill was created having a vertical handle according to FIG. 1 within the scope of the shown exemplary embodiments, the invention is neither limited to such an arrangement nor to the application in an angled manner of the first or second drive motor (or assigned motor shafts) connected thereto. These can be coupled to the transmission module according to the invention in any arbitrary manner, said transmission module then not being mounted parallel along the shaft 30 but also at a different angle on the displacement nut or the rotary drive wheel of the spindle.

Moreover, as far as favorable operation and configuration parameters of the described transmission module for the shared rotatory and displacement movement of the spindle, for example regarding transmission translations, rotation speed ratios and so on, are not discussed in detail in the present description, document EP 2 754 531 B1 forming the generic basis can be used as a supplementing reference.

The invention claimed is:

1. A drilling machine having a spindle (15) for rotatably driving a drilling tool which is attached or can be attached, and is associated with shared rotary drive means which interact with a first drive motor (24) for the rotatory drive and is associated with shared displacement drive means which interact with a second drive motor (26) for an axial displacement of the spindle in such a manner that during the rotary drive via the first drive motor, the spindle can be axially displaced via the impact of the second drive motor, the rotary drive means comprising a rotary drive wheel (38) being connected to the spindle for rotation therewith and the displacement drive means comprising a displacement nut (58) which interacts in a slide-like manner with a threaded section (60) of the spindle (15), and transmission means for interacting with the rotary drive wheel and the displacement nut being integrated as a transmission module and being realized so as to be connected with the first and the second drive motor, wherein the transmission means comprise a displacement wheel (54) for meshably engaging with a toothing of the displacement nut (58), said displacement wheel (54) being driven in such a way by a gearwheel arrangement (46, 42) gripping onto an outer toothing (52) of the displacement wheel that at least one first gearwheel (42 a-c) of the gearwheel arrangement receives a drive torque of the second drive motor, meshing directly with a drive shaft (30) of the second drive motor (26, 26A), and at least one second gearwheel (46 a-c, 46'a-c) of the gearwheel arrangement transmits a drive torque of the first gearwheel (42a-c) onto the outer toothing (52), meshing directly with the first gearwheel and the outer toothing, the gearwheel arrangement being retained in a gearwheel carrier (44) in such a manner that at least the second gearwheel is replaceable and detachable from the transmission module during a dismounting of the displacement wheel and/or an assembly which drives the rotary drive wheel.

2. The drilling machine according to claim 1, wherein the displacement wheel (54) and the gearwheel carrier (44) are coaxially mounted on a shaft (30) associated with the second drive motor (26) and mounted parallel to the axis of the spindle (15).

3. The drilling machine according to claim 2, wherein a gearwheel unit (32) driving the rotary drive wheel (38) which is axially adjacent to the gearwheel carrier (44) is provided on a side of the gearwheel carrier opposite to the displacement wheel (54) and coaxially to the shaft (30).

4. The drilling machine according to claim 3, wherein the second or the first drive motor acts on the shaft (30) and/or the gearwheel unit at an angle greater than 0° so as to introduce a torque.

5. The drilling machine according to claim 1, wherein the second gearwheel (46 a-c) of the gearwheel arrangement comprises an individual unstepped toothing.

6. The drilling machine according to claim 1, wherein the first and/or the second gearwheel of the gearwheel arrangement comprise(s) a stepped toothing which is designed for the second gearwheel in such a manner that a first gearwheel section (70) of a larger toothed circle diameter meshes with the outer toothing (52) of the displacement wheel (54) and a second gearwheel section (72) of a smaller toothed circle diameter meshes with the first gearwheel (42 a-c).

7. The drilling machine according to claim 1, wherein the displacement wheel (54) comprises a first externally toothed displacement-wheel section (56) of a larger toothed circle diameter for interacting with the displacement nut (58) as well as a second externally toothed displacement-wheel section (52) of a smaller toothed circle diameter for interacting with the second gearwheel (46, 46').

8. A drilling machine system comprising the drilling machine according to claim 1, wherein at least one additional set of the first and second gearwheels is provided for replacing the at least one first (42 a-c) and the at least one second (46 a-c) gearwheel of the gearwheel arrangement so that a different transmission translation between the second drive motor and the displacement wheel is realized when mounting and subsequently operating the additional set in the transmission module.

9. Use of the drilling machine according to claim 1 as a hand drill, wherein the first drive motor and the second drive motor are accommodated in a joint handle (10) for manual handling.

10. Use of the drilling machine according to claim 1 for producing bores for aircrafts and/or for driving drilling tools for realizing bores within a diameter range of 4 mm and 30 mm in a metal material and/or a composite material.

11. The drilling machine according to claim 1, wherein the first and the second gear wheel are replaceable and detachable from the transmission module.

12. The drilling machine according to claim 1, wherein at least the second gear wheel is replaceable and detachable from the transmission module during a dismounting of a gear wheel unit.

13. The drilling machine according to claim 4, wherein the angle greater than 0° is rectangular.

14. The drilling machine according to claim 6, wherein solely the second gearwheel (46'a-c), of the gearwheel arrangement comprises a stepped toothing which is designed for the second gearwheel in such a manner that a first gearwheel section (70) of a larger toothed circle diameter meshes with the outer toothing (52) of the displacement wheel (54) and a second gearwheel section (72) of a smaller toothed circle diameter meshes with the first gearwheel (42 a-c).

15. The use of claim 9, wherein the handle is a gun-like handle.

16. The use of claim 10, wherein the diameter range is between 10 mm and 30 mm.

17. The use of claim 10, wherein the diameter range is between 12 mm and 25 mm.

* * * * *